United States Patent
Gleize

(10) Patent No.: US 11,242,157 B2
(45) Date of Patent: Feb. 8, 2022

(54) PRIMARY STRUCTURE OF AN AIRCRAFT PYLON HAVING AT LEAST ONE TRANSVERSE REINFORCER EQUIPPED WITH TWO DIAGONALLY DISPOSED LINK RODS, AND AIRCRAFT COMPRISING SUCH A PRIMARY STRUCTURE

(71) Applicant: Airbus Operations SAS, Toulouse (FR)

(72) Inventor: Olivier Gleize, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 198 days.

(21) Appl. No.: 16/782,271

(22) Filed: Feb. 5, 2020

(65) Prior Publication Data
US 2020/0269987 A1    Aug. 27, 2020

(30) Foreign Application Priority Data
Feb. 22, 2019    (FR) ...................................... 1901850

(51) Int. Cl.
*B64D 27/26*    (2006.01)
*B64D 29/02*    (2006.01)

(52) U.S. Cl.
CPC ............. *B64D 27/26* (2013.01); *B64D 29/02* (2013.01); *B64D 2027/264* (2013.01)

(58) Field of Classification Search
CPC ... B64D 27/18; B64D 27/26; B64D 2027/264
See application file for complete search history.

(56) References Cited

U.S. PATENT DOCUMENTS

| 6,126,110 | A   | * | 10/2000 | Seaquist ................ | B64D 27/18 244/54 |
| 7,931,232 | B2  |   | 4/2011  | Bernardi et al. | |
| 2005/0274485 | A1 | * | 12/2005 | Huggins ................ | B64D 27/26 164/349 |
| 2008/0251634 | A1 | * | 10/2008 | Bernardi ................ | B64D 27/18 244/54 |
| 2011/0121132 | A1 | * | 5/2011  | Crook ................... | B23P 15/008 244/54 |
| 2012/0104162 | A1 | * | 5/2012  | West .................... | B64C 1/1453 244/54 |

FOREIGN PATENT DOCUMENTS

| CN | 109606703 A | 4/2019 |
| FR | 2891803 A1  | 4/2007 |

OTHER PUBLICATIONS

French Search Report; priority document.

\* cited by examiner

*Primary Examiner* — Richard G Davis
(74) *Attorney, Agent, or Firm* — Greer, Burns & Crain, Ltd.

(57) ABSTRACT

A primary structure of an aircraft pylon, which comprises upper and lower spars, right-hand and left-hand lateral panels, transverse reinforcers that are disposed in transverse planes and, each have a square or rectangular contour and at least one sole to which the upper and lower spars and the right-hand and left-hand lateral panels are fastened. At least one of the transverse reinforcers of the primary structure has first and second link rods that are oriented along diagonals of the transverse reinforcer, and connecting systems that each connect first and second ends of the first and second link rods to the sole or to one of the soles.

14 Claims, 5 Drawing Sheets

PRIMARY STRUCTURE OF AN AIRCRAFT PYLON HAVING AT LEAST ONE TRANSVERSE REINFORCER EQUIPPED WITH TWO DIAGONALLY DISPOSED LINK RODS, AND AIRCRAFT COMPRISING SUCH A PRIMARY STRUCTURE

CROSS-REFERENCES TO RELATED APPLICATIONS

This application claims the benefit of the French patent application No. 1901850 filed on Feb. 22, 2019, the entire disclosures of which are incorporated herein by way of reference.

FIELD OF THE INVENTION

The present application relates to a primary structure of an aircraft pylon, having at least one transverse reinforcer equipped with two diagonally disposed link rods, and to an aircraft comprising at least one such primary structure.

BACKGROUND OF THE INVENTION

According to an embodiment that can be seen in FIGS. 1 and 2, an aircraft 10 comprises a plurality of propulsion units 12 positioned under each of the wings 14 of the aircraft. Each propulsion unit 12 comprises an engine 16, a nacelle (not shown in FIG. 2) positioned around the engine 16, and a pylon 18 connecting the engine 16 and the wing 14. The pylon 18 comprises a primary structure 20, which is connected to the engine 16 by an engine attachment 22 and to the wing 14 by a wing attachment 24.

According to an embodiment that can be seen in FIG. 3, the primary structure 20 comprises:
an upper spar 26,
a lower spar 28,
transverse reinforcers 30 that connect the upper and lower spars 26, 28, are disposed in transverse planes and each have an approximately square or rectangular contour,
a front-end element 32 that connects a front end 26.1 of the upper spar 26 and a front end 28.1 of the lower spar 28,
a rear-end element 34 that connects a rear end 26.2 of the upper spar 26 and a rear end 28.2 of the lower spar 28,
two, right-hand and left-hand lateral panels 36 that are disposed on either side of the transverse reinforcers 30.

Each transverse reinforcer 30 comprises an outer frame 38 against which the upper and lower spars 26, 28 and the right-hand and left-hand lateral panels 36 are pressed, and a core 40 configured to reinforce the outer frame 38.

This core 40 comprises an inner frame 42, a web 44, positioned in a transverse plane, connecting the outer and inner frames 38, 42, and a plurality of ribs 46 that are perpendicular to the web 44.

According to one embodiment, each transverse reinforcer 30 is forged from titanium. Given its geometry, each transverse reinforcer has a relatively large mass. Moreover, it is made from a bulky blank that requires a high-power press for forging.

The present invention aims to remedy all or some of the drawbacks of the prior art.

SUMMARY OF THE INVENTION

To this end, a subject of the invention is a primary structure of an aircraft pylon, comprising upper and lower spars, right-hand and left-hand lateral panels, and transverse reinforcers that are disposed in transverse planes and each have a square or rectangular contour and at least one sole to which the upper and lower spars and the right-hand and left-hand lateral panels are fastened. According to the invention, at least one of the transverse reinforcers of the primary structure comprises first and second link rods that are oriented along diagonals of the transverse reinforcer and each have first and second ends, and connecting systems that each connect first and second ends of the first and second link rods to the sole or to one of the soles.

This design makes it possible to reduce the volume of material of each transverse reinforcer. Moreover, it makes it possible to free up a large passage cross section at the center of the transverse reinforcer, making it easier to incorporate elements inside the primary structure.

According to another feature, at least one of the first and second link rods is variable in length.

According to another feature, each connecting system comprises at least one web that connects one of the first and second ends of the first and second link rods to the sole or to one of the soles, each web being a wall of small thickness, disposed in a transverse plane, that is secured to the sole or to one of the soles. In addition, each connecting system comprises a pivoting connecting pin that connects one of the ends of the first and second link rods to at least one of the webs, the pivoting connecting pin being oriented in a longitudinal direction.

In a first configuration, each connecting system comprises a web and the first or second end of the first or second link rod comprises a slot configured to accommodate the web.

In a second configuration, each connecting system comprises two webs, between which the first or second end of the first or second link rod is positioned.

According to a first embodiment, the transverse reinforcer comprises an outer frame that extends continuously around the entire perimeter of the transverse reinforcer between a first edge positioned in a first transverse plane and a second edge positioned in a second transverse plane, which is parallel to the first transverse plane and offset with respect to the latter in a longitudinal direction, the outer frame having an outer surface forming the sole.

According to this first embodiment, the outer frame comprises two main webs that extend on two parallel sides of the outer frame, in a transverse plane, equidistantly from the first and second edges, and, for each of the ends of the first and second link rods, secondary webs that are parallel to the main webs and spaced apart from the latter.

According to this first embodiment, the secondary webs connected to the first link rod are offset towards the first edge with respect to the main web while the secondary webs connected to the second link rod are offset towards the second edge with respect to the main web.

According to a second embodiment, the transverse reinforcer comprises four L-shaped brackets that are positioned at each corner of the transverse reinforcer, are separate from one another and connected in pairs by the first and second link rods, each of the four L-shaped brackets having an outer surface forming a sole.

According to this second embodiment, the four L-shaped brackets have first, coplanar edges that are positioned in a first transverse plane, and second edges that are positioned in a second transverse plane that is parallel to the first transverse plane and offset in a longitudinal direction with respect to the latter. In addition, each L-shaped bracket has a single web, which is positioned at the first edge for the L-shaped brackets connected to the first link rod or at the second edge for the L-shaped brackets connected to the second link rod.

According to a third embodiment, the transverse reinforcer comprises two separate U-shaped brackets that are connected by the first and second link rods, each U-shaped bracket having an outer surface that forms a sole, a base and two legs.

According to this third embodiment, the two U-shaped brackets have first, coplanar edges that are positioned in a first transverse plane, and second edges that are positioned in a second transverse plane that is parallel to the first transverse plane and offset in a longitudinal direction with respect to the latter. In addition, each U-shaped bracket comprises a main web that connects the two legs and is positioned in a transverse plane, equidistantly from the first and second edges, and, for each of the ends of the first and second link rods, secondary webs that are parallel to the main web and spaced apart from the latter.

According to this third embodiment, for each U-shaped bracket, the secondary web connected to the first link rod is offset towards the first edge with respect to the main web while the secondary web connected to the second link rod is offset towards the second edge with respect to the main web.

A further subject of the invention is an aircraft comprising a primary structure according to one of the preceding features.

BRIEF DESCRIPTION OF THE DRAWINGS

Further features and advantages will become apparent from the following description of the invention, this description being given only by way of example, with reference to the appended drawings, in which.

DETAILED DESCRIPTION OF THE PREFERRED EMBODIMENTS

Figure 5:
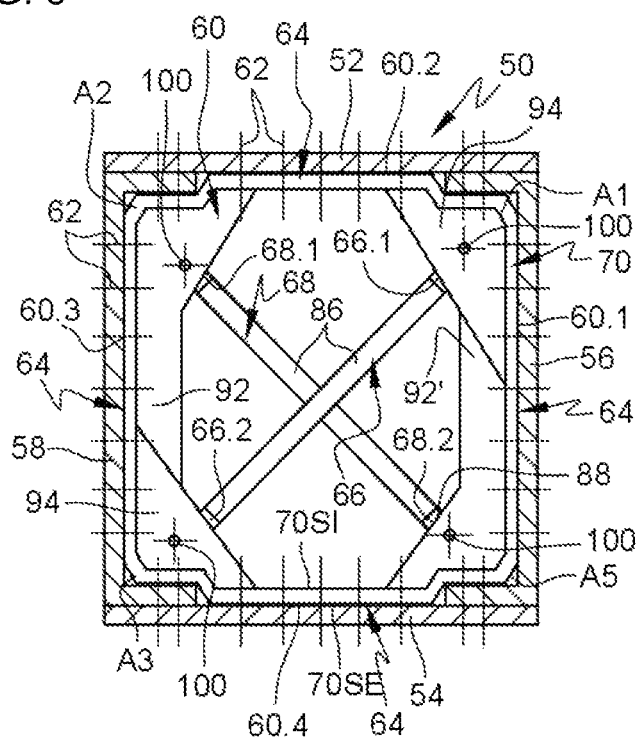
FIG. 5 is a cross section through a primary structure of an aircraft pylon, having at least one transverse reinforcer as can be seen in FIG. 4.
Figure 7:
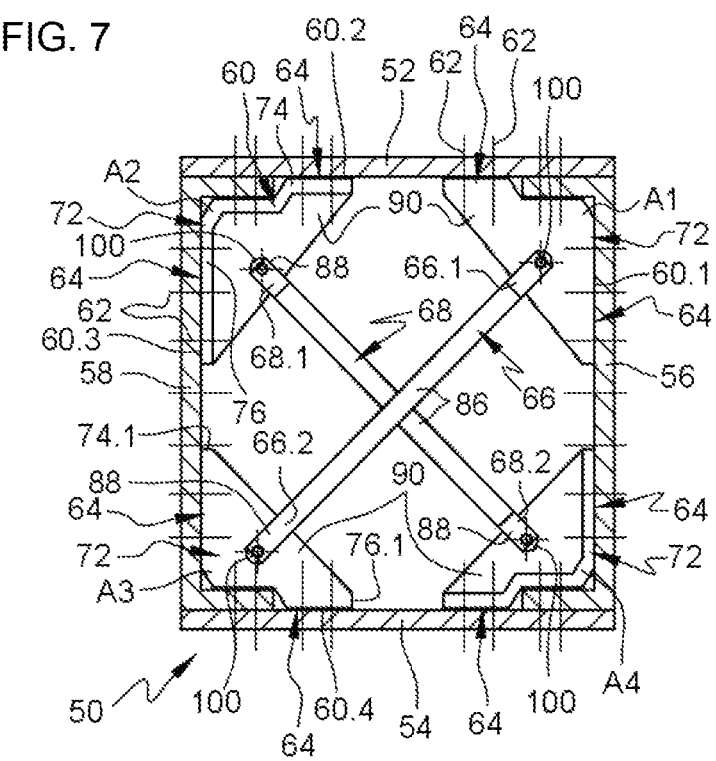
FIG. 7 is a cross section through a primary structure of an aircraft pylon, having at least one transverse reinforcer as can be seen in FIG. 6.
Figure 9:
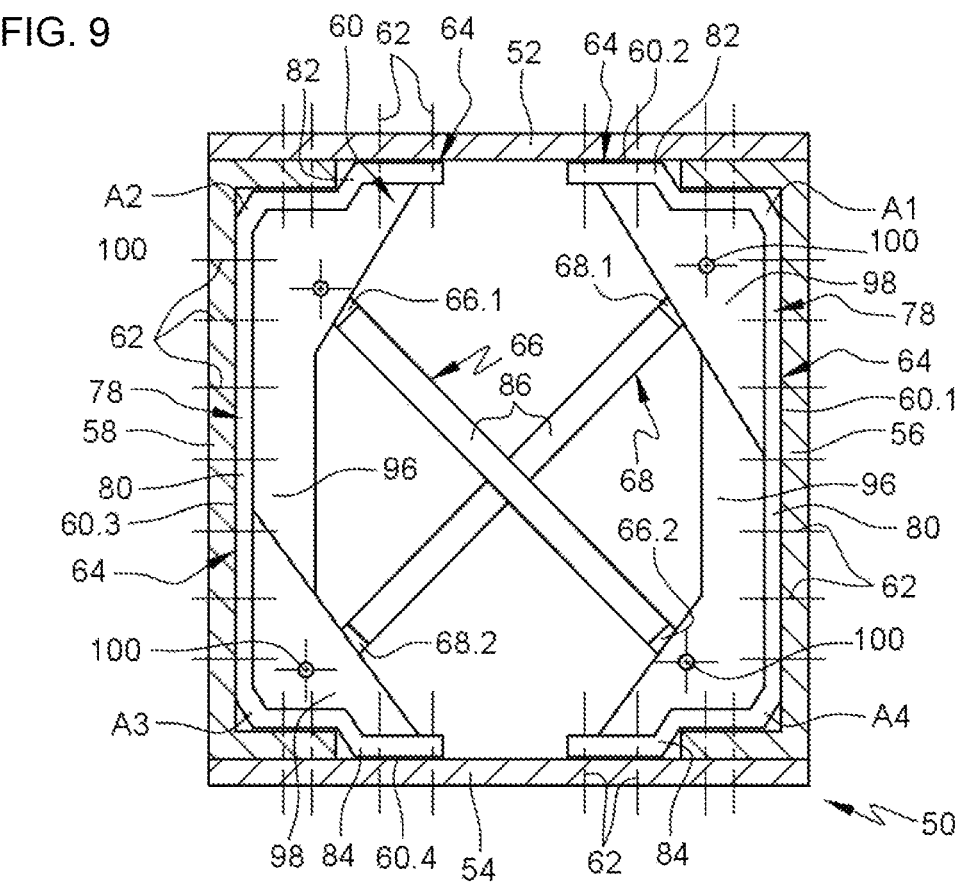
FIG. 9 is a cross section through a primary structure of an aircraft pylon, having at least one transverse reinforcer as can be seen in FIG. 8.

According to the embodiments that are shown in FIGS. 5, 7 and 9, a primary structure 50 of an aircraft pylon comprises, in particular:

upper and lower spars 52, 54,
right-hand and left-hand lateral panels 56, 58,
transverse reinforcers 60 that are disposed in transverse planes, each have an approximately square or rectangular contour, and connect the upper and lower spars 52, 54 and the right-hand and left-hand lateral panels 56, 58.

In the rest of the description, a longitudinal direction is perpendicular to the transverse planes.

In a first assembly method, in a first step, brackets are fastened to the edges of the upper and lower spars 52, 54. Thus, each upper or lower spar 52, 54 equipped with two brackets is U shaped. In a second step, the transverse reinforcers 60 are inserted between the legs of the U shapes of the upper and lower spars 52, 54 equipped with the brackets. In a final step, the right-hand and left-hand lateral panels 56, 58 are fitted.

According to another embodiment illustrated in FIGS. 5, 7 and 9, each right-hand or left-hand lateral panel 56, 58 is U shaped. The transverse reinforcers 60 are inserted between the legs of the U shapes. Finally, the upper and lower spars 52, 54 are fitted. The right-hand and left-hand lateral panels 56, 58 and the upper and lower spars 52, 54 are connected to the transverse reinforcers 60 by connecting elements 62.

The upper and lower spars 52, 54, the right-hand and left-hand lateral panels 56, 58 and the assembly method are not described further, since they can be identical to those of the prior art.

Each transverse reinforcer 60 has an approximately square or rectangular perimeter and has a first corner A1 connecting a right-hand side 60.1 and an upper side 60.2, a second corner A2 connecting the upper side 60.2 and a left-hand side 60.3, a third corner A3 connecting the left-hand side 60.3 and a lower side 60.4 and a fourth corner A4 connecting the lower side 60.4 and the right-hand side 60.1.

According to the embodiments that are shown in FIGS. 4 to 10, at least one of the transverse reinforcers 60 of the primary structure 50 comprises:

at least one sole 64, to which the upper and lower spars 52, 54 and the right-hand and left-hand lateral panels 56, 58 are fastened, first and second link rods 66, 68 that are oriented along diagonals of the transverse reinforcer 60 and each have first and second ends 66.1, 66.2, 68.1, 68.2, and connecting systems that each connect first and second ends 66.1, 66.2, 68.1, 68.2 of the first and second link rods 66, 68 to the sole 64 or one of the soles 64.

In one configuration, the first and second ends 66.1, 66.2 of the first link rod 66 extend between the first and third corners A1, A3 and the first and second ends 68.1, 68.2 of the second link rod 68 extend between the second and fourth corners A2, A4.

Figure 1:
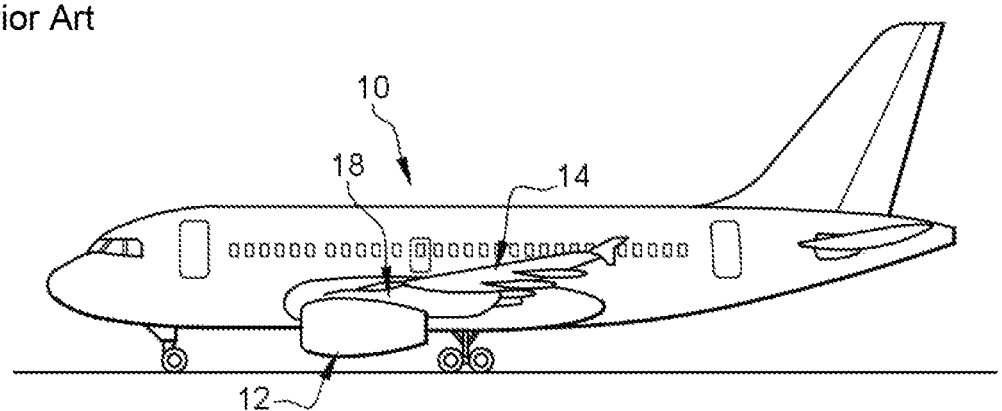
FIG. 1 is a side view of an aircraft.
Figure 2:
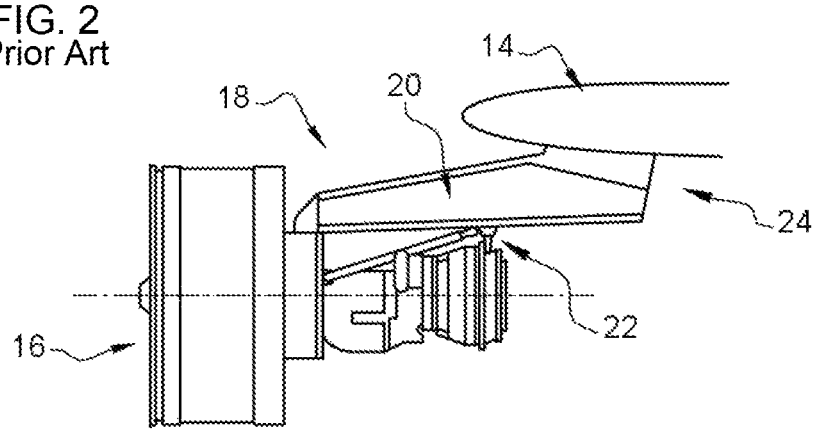
FIG. 2 is a schematic lateral depiction of a propulsion unit (the nacelle not being shown)
Figure 3:
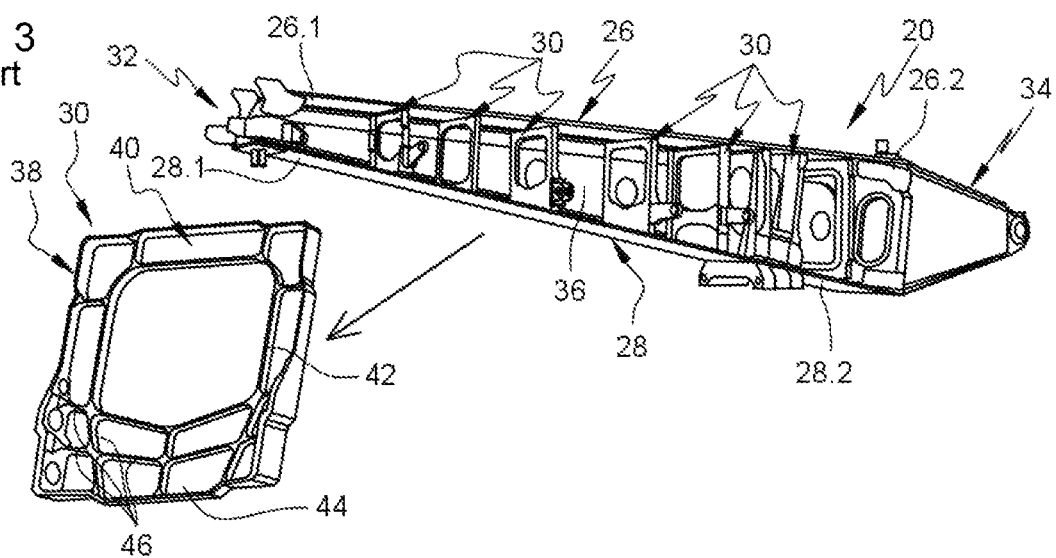
FIG. 3 is a perspective view of a primary structure of an aircraft pylon and of a transverse reinforcer, illustrating an embodiment of the prior art.
Figure 4:
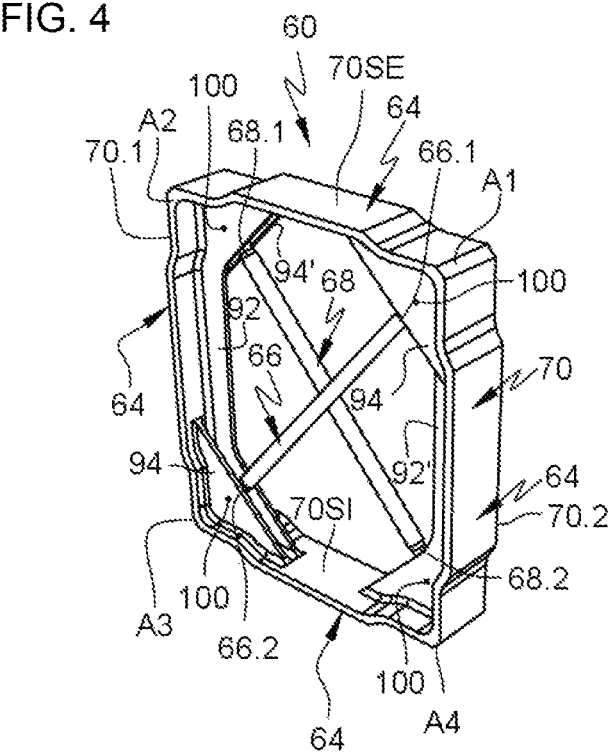
FIG. 4 is a perspective view of a transverse reinforcer of a primary structure of an aircraft pylon, which illustrates a first embodiment of the invention.

According to a first embodiment, which can be seen in FIGS. 4 and 5, the transverse reinforcer 60 comprises an outer frame 70, which extends continuously around the entire perimeter of the transverse reinforcer 60 and has an outer surface 70SE forming the sole 64 and an inner surface 70SI. The outer frame 70 extends between a first edge 70.1 positioned in a first transverse plane and a second edge 70.2 positioned in a second transverse plane that is parallel to the first transverse plane and offset in the longitudinal direction with respect to the latter.

Figure 6:
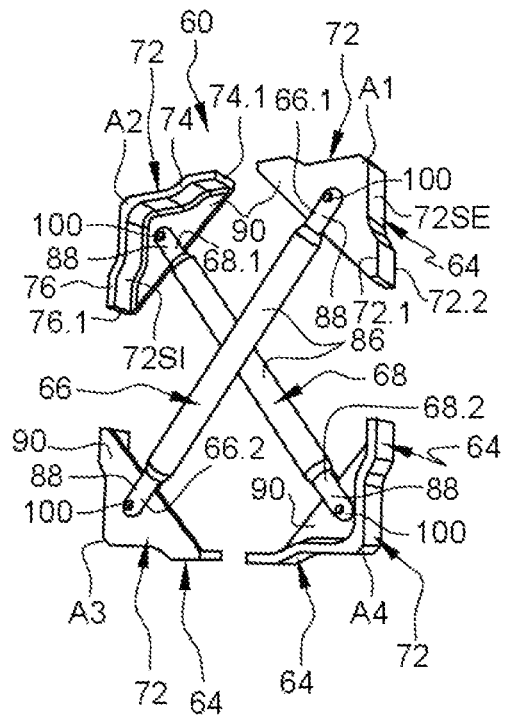
FIG. 6 is a perspective view of a transverse reinforcer of a primary structure of an aircraft pylon, which illustrates a second embodiment of the invention.

According to a second embodiment, which can be seen in FIGS. 6 and 7, the transverse reinforcer 60 comprises four L-shaped brackets 72 that are positioned at each corner A1 to A4 of the transverse reinforcer 60 and each have an outer surface 72SE forming a sole 64 and an inner surface 72SI.

The four L-shaped brackets 72 are separate and are connected in pairs by the first and second link rods 66, 68. In one design, the four L-shaped brackets 72 are identical and each comprise two legs 74, 76 that each have a free end 74.1, 76.1, one of the upper or lower spars 52, 54 being pressed against one of the legs 74, 76 and one of the right-hand or left-hand lateral panels 56, 58 being pressed against the other leg 74, 76.

The four L-shaped brackets 72 have first, coplanar edges 72.1 positioned in a first transverse plane and second edges 72.2 positioned in a second transverse plane, which is parallel to the first transverse plane and offset in the longitudinal direction with respect to the latter.

Figure 8:
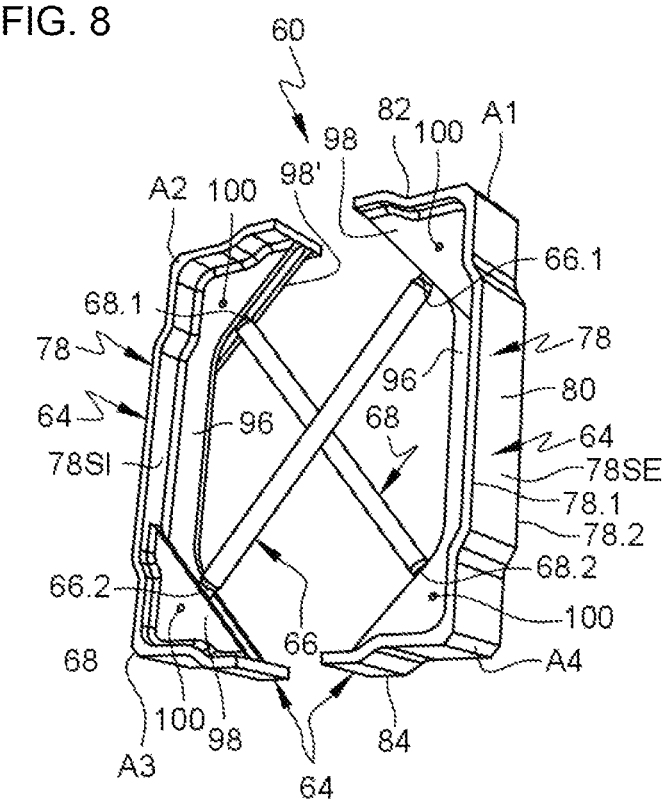
FIG. 8 is a perspective view of a transverse reinforcer of a primary structure of an aircraft pylon, which illustrates a third embodiment of the invention.

According to a third embodiment, which can be seen in FIGS. 8 and 9, the transverse reinforcer 60 comprises two U-shaped brackets 78 that each have an outer surface 78SE forming a sole 64 and an inner surface 78SI. The two U-shaped brackets 78 are separate and are connected by the first and second link rods 66, 68. The two U-shaped brackets 78 are identical and each have a base 80 and two legs 82, 84. According to the third embodiment, the bases 80 of the U-shaped brackets 78 are pressed against the right-hand and left-hand lateral panels 56, 58.

Figure 10:
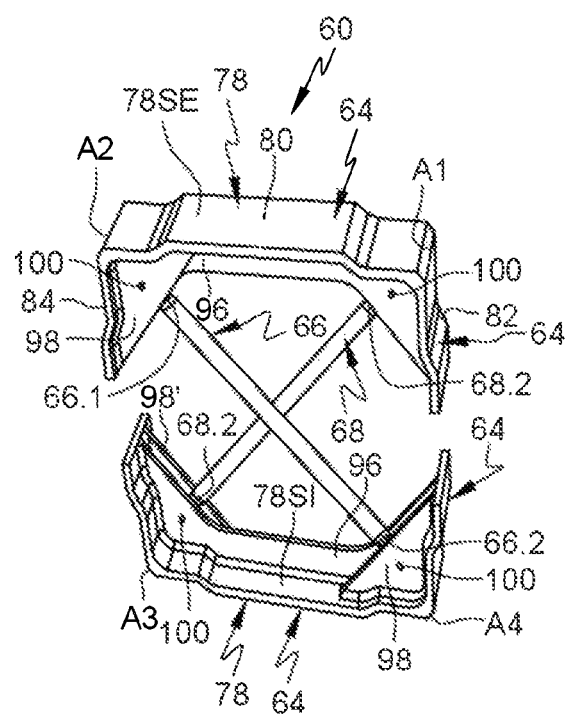
FIG. 10 is a perspective view of a transverse reinforcer of a primary structure of an aircraft pylon, which illustrates a fourth embodiment of the invention.

According to a fourth embodiment, which can be seen in FIG. 10, like the third embodiment, the transverse reinforcer 60 comprises two U-shaped brackets 78. According to this fourth embodiment, the bases 80 of the U-shaped brackets 78 are pressed against the upper and lower spars 52, 54.

The two U-shaped brackets 78 have first, coplanar edges 78.1 positioned in a first transverse plane and second edges 78.2 positioned in a second transverse plane, which is parallel to the first transverse plane and offset in the longitudinal direction with respect to the latter.

According to one embodiment, each link rod 66, 68 comprises a body 86 and each of the first and second ends 66.1, 66.2, 68.1, 68.2 of the first and second link rods 66, 68 comprises a head 88 connected to the body 86 by a link. In a first configuration, the link between each head 88 and the body 86 is rigid. In another configuration, at least one of the first and second link rods 66, 68 is variable in length. To this end, for at least one of the first and second link rods 66, 68, at least one link between one of the heads 88 and the body 86 is variable in length in order to adjust the length between the two heads 88.

According to another feature, each connecting system comprises at least one web 90, 92, 92', 94, 94' 96, 98, 98' that connects one of the first and second ends 66.1, 66.2, 68.1, 68.2 of the first and second link rods 66, 68 to the sole 64 or to one of the soles. In one design, each web 90, 92, 92', 94, 94' 96, 98, 98' is a wall of small thickness, disposed in a transverse plane, that is secured to the sole 64 or to one of the soles 64.

In a first configuration, each connecting system comprises a web 90 and the first or second end of the first or second link rod 66.1, 66.2, 68.1, 68.3 comprises a slot configured to accommodate the web 90.

In a second configuration, each connecting system comprises two webs 92, 92', 94, 94' 96, 98, 98', between which the first or second end of the first or second link rod 66.1, 66.2, 68.1, 68.3 is positioned.

Irrespective of the configuration, each connecting system comprises a pivoting connecting pin 100 that connects one of the ends 66.1, 66.2, 68.1, 68.2 of the first and second link rods 66, 68 to at least one of the webs 90, 92, 92', 94, 94', 96, 98, 98', the pivoting connecting pin 100 being oriented approximately in a longitudinal direction and being configured to take up, in particular, shear stresses associated with the torsional loads to which the primary structure 50 is subjected.

Of course, the invention is not limited to this embodiment for the connecting system 100.

According to one embodiment, which can be seen in FIG. 6, each L-shaped bracket 72 has a single web 90 and each head 88 of the link rods 66, 68 comprises a slot configured to accommodate the web 90 of one of the L-shaped brackets 72. For the L-shaped brackets 72 connected to the first link rod 66, the web 90 is positioned at the first edge 72.1, has a triangular shape and extends as far as the free ends 74.1, 76.1 of the two legs 74, 76. For the L-shaped brackets 72 connected to the second link rod 68, the web 90 is positioned at the second edge 72.2, has a triangular shape and extends as far as the free ends 74.1, 76.1 of the two legs 74, 76.

According to another embodiment, which can be seen in FIG. 4, for each end 66.1, 66.2, 68.1, 68.2 of the first and second link rods 66, 68, the outer frame 70 comprises two webs that are spaced apart so as to accommodate the end 66.1, 66.2, 68.1, 68.2 and, more particular, the head 88 thereof. In one configuration, the outer frame 70 comprises two main webs 92, 92', which extend on two parallel sides of the outer frame 70, in a transverse plane, approximately equidistantly from the first and second edges 70.1, 70.2, and, for each of the ends 66.1, 66.2, 68.1, 68.2 of the first and second link rods 66, 68, secondary webs 94, 94' that are parallel to the main webs 92, 92', are spaced apart from the latter and have an approximately triangular shape. The secondary webs 94 connected to the first link rod 66 are offset towards the first edge 70.1 with respect to the main web 92, 92' while the second webs 94' connected to the second link rod 68 are offset towards the second edge 70.2 with respect to the main web 92, 92'.

According to another embodiment, which can be seen in FIGS. 8 and 10, each U-shaped bracket 78 comprises a main web 96 that connects the two legs 82, 84 and is positioned in a transverse plane, approximately equidistantly from the first and second edges 78.1, 78.2, and, for each of the ends 66.1, 66.2, 68.1, 68.2 of the first and second link rods 66, 68, secondary webs 98, 98' that are parallel to the main web 96, are spaced apart from the latter and have an approximately triangular shape. For each U-shaped bracket 78, the secondary web 98 connected to the first link rod 66 is offset towards the first edge 78.1 with respect to the main web 96 while the secondary web 98' connected to the second link rod 68 is offset towards the second edge 78.2 with respect to the main web 96.

Irrespective of the embodiment, the transverse reinforcer 60 has a volume of material less than that of a transverse reinforcer of the prior art. Consequently, the mass of each transverse reinforcer 60 is reduced compared with that of the transverse reinforcers of the prior art.

Irrespective of the embodiment, the webs 90, 92, 92', 94, 94', 96, 98, 98' and the link rods 66, 68 free up a large passage cross section, making it easier to incorporate elements inside the primary structure.

In one procedure, each transverse reinforcer 60 is produced by forging. In this case, each transverse reinforcer is obtained from a blank having dimensions smaller than those of a prior art blank. Consequently, the transverse reinforcer 60 can be forged with the aid of a less powerful press than the one used to forge the transverse reinforcers of the prior art.

According to another advantage, the same link rods 66 and 68 can be used for all the transverse reinforcers of one and the same primary structure and for all the primary structures of the various aircraft types.

When the transverse reinforcer 60 is produced from an outer frame 70, the latter is dimensioned in accordance with the cross section of the primary structure, which changes in the longitudinal direction. Thus, the outer frames 70 of one and the same primary structure are generally different, and the outer frames 70 have different dimensions from one aircraft type to another.

When the transverse reinforcers 60 comprise separate U-shaped brackets 78, some transverse reinforcers 60 of one and the same primary structure, having different cross sections, comprise identical U-shaped brackets 78. Moreover, some U-shaped brackets 78 can be common to primary structures of different aircraft types.

When the transverse reinforcers 60 comprise four L-shaped brackets 72, it is possible to use the same L-shaped brackets 72 for several transverse reinforcers 60 distributed in the longitudinal direction of one and the same primary structure and for the primary structures of different aircraft types.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A primary structure of an aircraft pylon, comprising:
   upper and lower spars,
   right-hand and left-hand lateral panels, and
   transverse reinforcers that are disposed in transverse planes and each have a square or rectangular contour and at least one sole to which the upper and lower spars and the right-hand and left-hand lateral panels are fastened,
   wherein at least one of the transverse reinforcers of the primary structure comprises first and second link rods that are oriented along diagonals of the transverse reinforcer and each have first and second ends, and connecting systems that each connect first and second ends of the first and second link rods to the sole or to one of the soles.

2. The primary structure according to claim 1, wherein at least one of the first and second link rods is variable in length.

3. The primary structure according to claim 1, wherein each of the connecting systems comprises at least one web that connects one of the first and second ends of the first and second link rods to the at least one sole, each web being a wall of small thickness, disposed in a transverse plane that is secured to the at least one sole, and wherein each of the connecting systems comprises a pivoting connecting pin that connects one of the ends of the first and second link rods to the at least one web, said pivoting connecting pin being oriented in a longitudinal direction.

4. The primary structure according to claim 3, wherein each of the connecting systems comprises a web and the first or second end of the first or second link rods comprises a slot configured to accommodate the web.

5. The primary structure according to claim 3, wherein each of the connecting systems comprises two webs, between which the first or second end of the first or second link rods is positioned.

6. The primary structure according to claim 1, wherein the transverse reinforcer comprises an outer frame that extends continuously around an entire perimeter of the transverse reinforcer between a first edge positioned in a first transverse plane and a second edge positioned in a second transverse plane, which is parallel to the first transverse plane and offset with respect to the first transverse plane in a longitudinal direction, said outer frame having an outer surface forming the sole.

7. The primary structure according to claim 6, wherein the outer frame comprises two main webs that extend on two parallel sides of the outer frame, in a transverse plane, equidistantly from the first and second edges, and, for each of the ends of the first and second link rods, secondary webs that are parallel to the main webs and spaced apart from the main webs.

8. The primary structure according to claim 7, wherein the secondary webs connected to the first link rod are offset towards the first edge with respect to the main web while the secondary webs connected to the second link rod are offset towards the second edge with respect to the main web.

9. The primary structure according to claim 1, wherein the transverse reinforcer comprises four L-shaped brackets that are positioned at each corner of the transverse reinforcer, are separate from one another and connected in pairs by the first and second link rods, each of the four L-shaped brackets having an outer surface forming the sole.

10. The primary structure according to claim 9, wherein the four L-shaped brackets have first, coplanar edges that are positioned in a first transverse plane, and second edges that are positioned in a second transverse plane that is parallel to the first transverse plane and offset in a longitudinal direction with respect to the first transverse plane, and wherein each L-shaped bracket has a single web, which is positioned at the first edge for the L-shaped brackets connected to the first link rod or at the second edge for the L-shaped brackets connected to the second link rod.

11. The primary structure according to claim 1, wherein the transverse reinforcer comprises two separate U-shaped brackets that are connected by the first and second link rods, each U-shaped bracket having an outer surface that forms the sole, a base and two legs.

12. The primary structure according to claim 11, wherein the two U-shaped brackets have first, coplanar edges that are positioned in a first transverse plane, and second edges that are positioned in a second transverse plane that is parallel to the first transverse plane and offset in a longitudinal direction with respect to the first transverse plane, and wherein each U-shaped bracket comprises a main web that connects the two legs and is positioned in a transverse plane, equidistantly from the first and second edges, and, for each of the ends of the first and second link rods, secondary webs that are parallel to the main web and spaced apart from the main web.

13. The primary structure according to claim 12, wherein, for each U-shaped bracket, the secondary web connected to the first link rod is offset towards the first edge with respect to the main web while the secondary web connected to the second link rod is offset towards the second edge with respect to the main web.

14. An aircraft comprising a primary structure according to claim 1.

* * * * *